United States Patent
Ghantous et al.

(10) Patent No.: US 9,995,069 B2
(45) Date of Patent: Jun. 12, 2018

(54) OPERATOR CAB FOR MACHINE HAVING DOOR WITH SWING CONTROLLING HINGE MECHANISM

(71) Applicant: Caterpillar Inc., Peoria, IL (US)

(72) Inventors: Emile Ghantous, Peoria, IL (US); Dale Higdon, Dunlap, IL (US); Pedro Urias Castro, Garcia (MX); Brent Frazier, Morton, IL (US); Kevin Stremlau, Peoria, IL (US); Aaron Dunaway, Brimfield, IL (US); Jason Stibs, Marquette Heights, IL (US)

(73) Assignee: Caterpillar Inc., Deerfield, IL (US)

( * ) Notice: Subject to any disclaimer, the term of this patent is extended or adjusted under 35 U.S.C. 154(b) by 68 days.

(21) Appl. No.: 15/187,725

(22) Filed: Jun. 20, 2016

(65) Prior Publication Data

US 2017/0362869 A1    Dec. 21, 2017

(51) Int. Cl.

| | |
|---|---|
| *E05D 11/06* | (2006.01) |
| *B62D 33/06* | (2006.01) |
| *E05D 3/02* | (2006.01) |
| *E05D 5/14* | (2006.01) |
| *E05D 11/00* | (2006.01) |
| *E05D 5/12* | (2006.01) |
| *E02F 9/16* | (2006.01) |
| *B60J 5/04* | (2006.01) |
| *E05D 5/10* | (2006.01) |

(52) U.S. Cl.
CPC ............... *E05D 11/06* (2013.01); *B60J 5/047* (2013.01); *B62D 33/0617* (2013.01); *E02F 9/163* (2013.01); *E05D 3/02* (2013.01); *E05D 5/121* (2013.01); *E05D 5/14* (2013.01); *E05D 11/0054* (2013.01); *E05D 2005/102* (2013.01); *E05D 2005/122* (2013.01)

(58) Field of Classification Search
CPC . B60J 5/047; E05D 11/06; E05D 3/02; E05D 5/14; E05F 5/08; E05F 1/063; E05F 1/061; E05F 5/025
USPC ........................................ 296/190.11, 146.11
See application file for complete search history.

(56) References Cited

U.S. PATENT DOCUMENTS

| | | | |
|---|---|---|---|
| 1,155,867 A * | 10/1915 | Allgier | E05F 3/20 16/50 |
| 2,685,102 A | 8/1954 | Forkey | |
| 3,518,716 A * | 7/1970 | Larson | E05F 1/1223 16/284 |
| 3,733,650 A * | 5/1973 | Douglas | E05F 1/063 16/312 |
| 4,007,958 A | 2/1977 | Peifer | |

(Continued)

FOREIGN PATENT DOCUMENTS

FR    1098665    8/1955

*Primary Examiner* — Jason S Morrow
(74) *Attorney, Agent, or Firm* — James S. Bennin; Mattingly, Burke, Cohen & Biederman

(57) ABSTRACT

An operator cab for a machine such as a motor grader includes an access door coupled to a frame by way of a hinge mechanism. The hinge mechanism has abutting cam and follower surfaces with geometry to control the swinging of the access door such as under the force of gravity. The cam surface has a double-sloped profile of rotation about the pivot axis of the hinge mechanism so that the access door swing is controlled in either of a first or a second swing direction toward a dwell location of the access door.

18 Claims, 4 Drawing Sheets

(56) References Cited

U.S. PATENT DOCUMENTS

| | | | |
|---|---|---|---|
| 4,215,449 A * | 8/1980 | Loikitz | E05F 1/063 |
| | | | 16/303 |
| 5,682,644 A | 11/1997 | Bohacik | |
| 7,065,834 B2 | 6/2006 | Lowry | |
| 7,945,996 B2 | 5/2011 | Gunderson | |
| 2003/0226237 A1 * | 12/2003 | Johnson | E05D 11/1085 |
| | | | 16/300 |
| 2005/0044661 A1 | 3/2005 | Cho | |
| 2013/0180177 A1 * | 7/2013 | Lazarevich | E05D 7/1005 |
| | | | 49/399 |
| 2015/0204128 A1 * | 7/2015 | Bacchetti | E05F 1/1223 |
| | | | 16/53 |
| 2016/0017648 A1 | 1/2016 | Petrelli | |
| 2016/0160545 A1 * | 6/2016 | Tolliver | E05D 5/10 |
| | | | 16/374 |

* cited by examiner

OPERATOR CAB FOR MACHINE HAVING DOOR WITH SWING CONTROLLING HINGE MECHANISM

TECHNICAL FIELD

The present disclosure relates generally to mounting strategies for machine access doors, and more particularly to a hinge mechanism that controls swinging of an access door in an operator cab of a machine.

BACKGROUND

In past decades, mobile machinery used in the fields of construction, mining, agriculture, forestry, and related industries often had a simple driver's seat or open platform or cockpit from where an operator controlled the machine. Depending upon the application, the operator was typically only minimally protected from the elements, with relatively little concern for comfort and protection of the various controls. Classic farm tractors, track-type machines, motor graders, excavators, and still others had relatively little need for protection of the relatively simple controls, often designed to withstand exposure to the elements.

In more modern machines, an increase awareness of the advantages of operator comfort with regard to decreased fatigue and improved productivity, not to mention the need to protect more sensitive and expensive computerized controls, displays, and communications equipment, has resulted in comfortable, secure, and highly functional operator cabs becoming more the norm on various types of equipment. Audio systems, heat and air conditioning, air filtration, comfort seats and ergonomic controls are standard equipment on many machines. Increased sophistication of the operator workspace has, of course, created new challenges for engineers and operator interface designers. Commonly owned U.S. Pat. No. 4,007,958 to Peifer is entitled Pivoted Window For Cab of Motor Vehicle. Peifer proposes a motor vehicle with a cab having forward observation windows where a pivoted, outwardly opening window structure has a lock to secure it in any desired position between a closed position and an open position. The window structure pivots about an axis located such that opening of the window does not interfere with a windshield wiper arm and blade.

SUMMARY OF THE INVENTION

In one aspect, an operator cab for a machine includes a frame having a roof, a floor positioned vertically below the roof, sides extending between the roof and the floor, and at least one of the sides having an access opening formed therein. The operator cab further includes an access door coupled to the frame and being pivotable in a swing range from a closed position blocking the access opening, to an open position, and a hinge mechanism. The hinge mechanism defines a pivot axis, and includes a first hinge element mounted to the frame and a second hinge element mounted to the access door to guide the pivoting of the access door. The pivot axis is oriented diagonally relative to a vertical axis extending between the roof and the floor. The hinge mechanism further includes a cam surface and a follower surface abutting the cam surface and rotatable relative to the cam surface during pivoting of the access door. The cam surface includes an opening ramp surface contacted by the follower surface in a first portion of the swing range to control the pivoting of the access door between the closed position and a dwell position, and a closing ramp surface contacted by the follower surface in a second portion of the swing range to control the pivoting of the access door between the open position and the dwell position.

In another aspect, a hinge mechanism for coupling an access door to a frame of an operator cab in a machine includes a first hinge element configured to mount to one of the frame and the access door and having a first hinge leaf including a first plurality of peripheral edges defining a first hinge leaf footprint, and a first hinge hub protruding from one of the first plurality of peripheral edges, such that the first hinge hub is positioned at least partially outside of the first hinge leaf footprint, and the first hinge hub including a follower surface. The hinge mechanism further includes a second hinge element configured to mount to the other of the frame and the access door and including a second hinge leaf having a second plurality of peripheral edges defining a second hinge leaf footprint, and a second hinge hub protruding from one of the second plurality of peripheral edges such that the second hinge hub is positioned at least partially outside of the second hinge leaf footprint, and the second hinge hub including a cam surface abutting the follower surface. The first hinge hub and the second hinge hub are pivotable relative to one another in a swing range, such that the cam surface and the follower surface rotate relative to one another about a pivot axis. The cam surface includes a double-sloped profile formed by an opening ramp surface contacted by the follower surface in a first portion of the swing range corresponding to swinging the access door between a closed position and a dwell position, and a closing ramp surface contacted by the follower surface in a second portion of the swing range corresponding to swinging the access door between an open position and the dwell position.

In still another aspect, a method of controlling swinging of a door to an access opening in an operator cab of a machine includes pivoting the door about a hinge mechanism in a first portion of a swing range between a closed position where the door closes the access opening, and a dwell position. The method further includes pivoting the door about the hinge mechanism in a second portion of the swing range between an open position and the dwell position. The method further includes contacting a follower surface in a first hinge element of the hinge mechanism with a first ramp surface of a cam surface in a second hinge element of the hinge mechanism, during pivoting the door in the first portion of the swing range. The method still further includes contacting the follower surface with a second ramp surface of the cam surface during pivoting the door in the second portion of the swing range.

DETAILED DESCRIPTION

Figure 1:
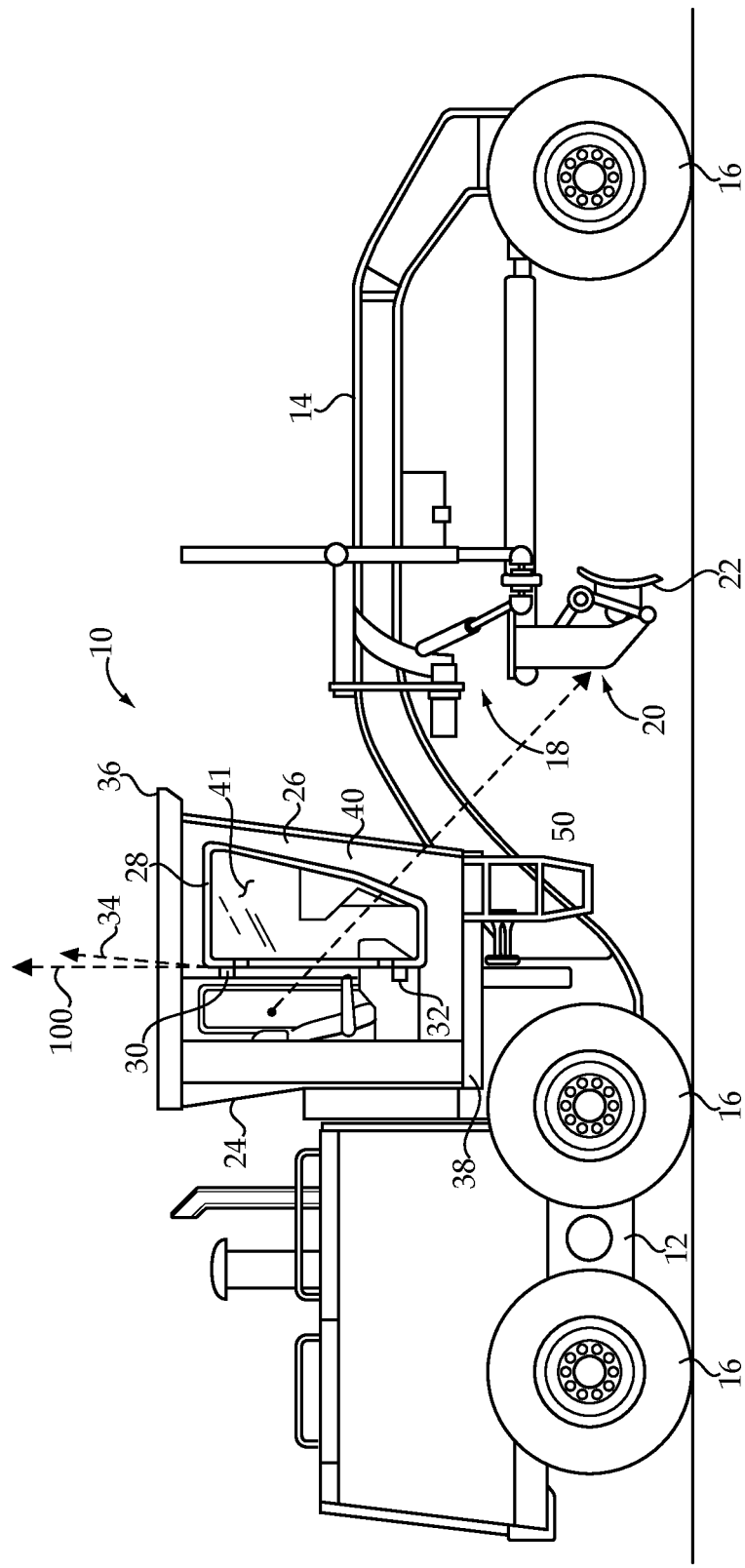
FIG. 1 is a side diagrammatic view of a machine having an operator cab, according to one embodiment.

Referring to FIG. 1, there is shown a machine 10 according to one embodiment, and having a front frame unit 12 and a back frame unit 14 structured to articulate relative to front frame unit 12. A plurality of ground-engaging elements 16 are mounted to front frame unit 14 and back frame unit 12. Machine 10 is shown in the context of a motor grader. Machine 10 may include an implement system 18 including, for example, a circle and drawbar assembly 20, and a grader blade 22 (hereinafter "blade 22") coupled with circle and drawbar assembly 20. In some embodiments, a different machine type might be advantageously designed according to the teachings set forth herein. An operator cab 24 (hereinafter "cab 24") is mounted to back frame unit 12, and can include various conventional internal components and features not specifically called-out or discussed herein. One access door 28 (hereinafter "door 28") is shown in FIG. 1 and extends across an access opening 41 into cab 24. In a typical design, similar or mirror-image access doors and access openings may be provided on either side of cab 24, and the description herein of features or functions of one access door are to be understood as applicable to the other access door(s). An operator line-of-sight from cab 24 to blade 22 is shown by way of reference numeral 50. In practical embodiments, cab 24 is designed so that line-of-sight 50 is unobstructed from cab 24 to a location of an outer edge of blade 22, on a left side of machine 10 and a right side of machine 10 approximately as shown. Given that blade 22 can be moved, it should be appreciated that line-of-sight 50 could vary side-to-side or front to back, but in general outer edges of blade 22 will be readily visible to an operator at least at the extreme left and right positions that blade 22 can assume. Those skilled in the art will appreciate the various ways in which a motor grader can be conventionally used, and the general desirability of providing for unobstructed or minimally obstructed visual monitoring of a blade (or other attached implement such as a mower) during grading of material so that work progress can be monitored and productivity optimized. As will be further apparent from the following description, certain design features of cab 24 are driven at least in part based upon considerations relating to the visual field and lines of sight of an operator.

To this end, cab 24 may include a frame 26 including a roof 36, a floor 38 positioned vertically below roof 36, and sides 40 extending between roof 36 and floor 38. At least one of sides 40 has access opening 41 formed therein. Access door 28 is coupled to frame 26 and pivotable in a swing range from a closed position blocking access opening 41, to an open position enabling access to access opening 41. A first hinge mechanism 30 and a second hinge mechanism 32 are further provided, and guide the pivoting of access door 28 through the swing range. Embodiments are contemplated where a single hinge mechanism according to the present disclosure is provided, as well as embodiments where more than one hinge mechanism is used. The present description of a hinge mechanism in the singular, or to only one of hinge mechanisms 30 and 32, should be understood to refer to each of a plurality of hinge mechanisms as applicable. Each hinge mechanism 30 and 32 may include a first hinge element mounted to frame 26, and a second hinge element mounted to access door 28. The terms "first" and "second" in the context of the present disclosure should not be construed to limit the description in any way. Thus, hinge mechanism 30 could be a first hinge mechanism or a second hinge mechanism, hinge mechanism 32 could be a first hinge mechanism or a second hinge mechanism, and so on. The individual hinge elements and further features thereof are discussed in connection with subsequently described drawings.

Hinge mechanism 30 may define a pivot axis 34 that is oriented diagonally relative to a vertical axis 100 extending between roof 36 and floor 38, such that door 28 is biased by the force of gravity to pivot outwardly from either of the closed position or the open position toward a dwell position within the swing range. Vertical and horizontal directions may be self-defining in cab 24, however, for exemplary purposes vertical axis 100 may extend through geometric center points for roof 36 and floor 38. For purposes including operator field of view and line-of-sight 50 to blade 22, cab 24 may be designed with at least some of sides 40 oriented generally diagonally between roof 36 and floor 38. Hinge mechanism 30 may be oriented such that pivot axis 34 is generally parallel to diagonal sides 40, although the present disclosure is not thereby limited. As a result of the diagonal orientation of pivot axis 34, a weight of door 28 can impart a tendency for door 28 to swing outwardly with sufficient speed as to be considered undesirable, without some mechanism for controlling the swinging of door 28. In FIG. 1, door 28 is shown in the closed position, and if unlatched would be likely to swing outwardly. Where door 28 is at a fully open position the weight of door 28 would also impart a tendency for door 28 to swing outwardly. The dwell position is at an angle between the closed position and the fully open position, and is a partially open position of door 28 where door 28 has settled to a stable state. As will be further apparent from the following description, hinge mechanism 30 is uniquely configured to control the pivoting of door 28 between the closed position and the dwell position such as by slowing the pivoting, and to control the pivoting of door 28 between the open position and the dwell position such as by slowing the pivoting.

Figure 2:
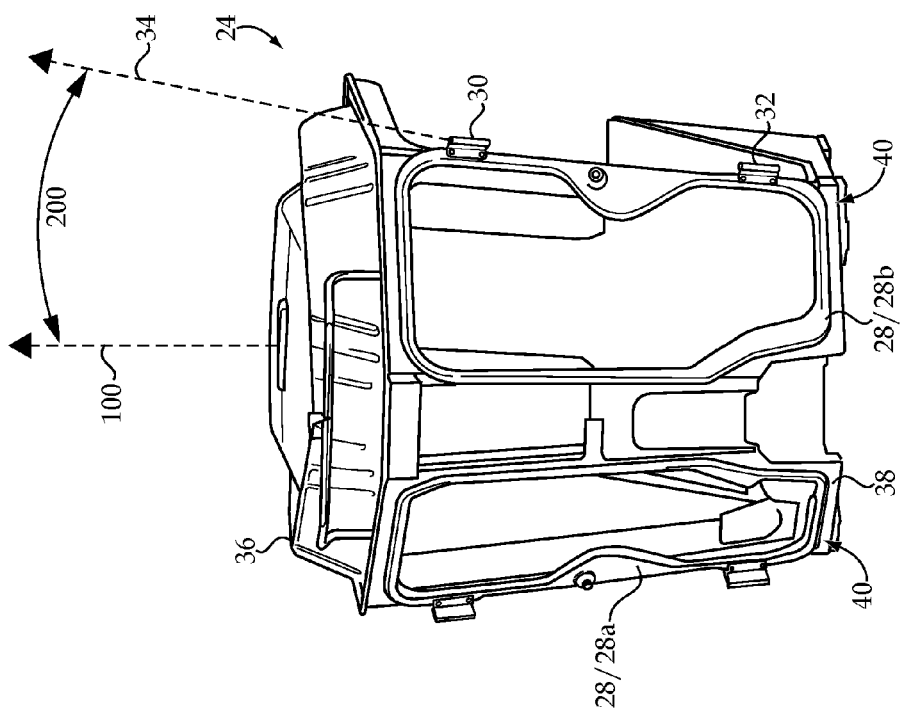
FIG. 2 is a first perspective view of an operator cab having an access door at a closed position, according to one embodiment.

Referring now to FIG. 2, there is shown a view of cab 24 illustrating a first access door 28/28a on a right-hand side of cab 24, and a second access door 28/28b on a left-hand side of cab 24. While the left-hand and right-hand doors may be mirror images of one another, in other embodiments they may be identical. Reference numeral 28 is used herein to refer generally to either of the left-hand or right-hand doors of cab 24. In FIG. 2, pivot axis 34 is shown oriented diagonally relative to vertical axis 200, and such that an angle 200 is formed by pivot axis 34 and vertical axis 100. Angle 200 opens in a vertically upward direction and may be about 20 degrees or less, in some instances about 10 degrees or less, although the present disclosure is not thereby limited and steeper angles or shallower angles might be present in other embodiments.

Figure 3:
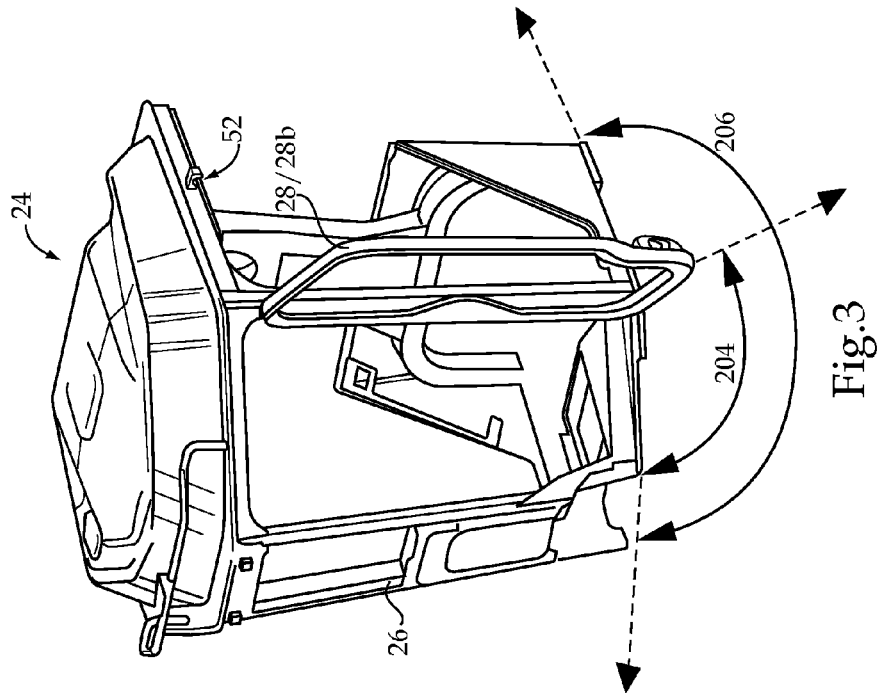
FIG. 3 is a second perspective view of the operator cab of FIG. 2 having the access door at a dwell position.

Referring now to FIG. 3, door 28/28b is shown approximately as it might appear positioned at the dwell position and pivoted an angle 204 from the closed position that is about half-way to the open position. A latch 52 may be mounted to frame 26 to releasably secure door 28 at the open position. A similar latch or a door lock, or both, could be provided to releasably secure door 28 at the closed position. An angle 206 in FIG. 3 illustrates the swing range, and may be greater than 180 degrees. In one embodiment angle 204 may be about 110 degrees and angle 206 may be from about 220 degrees to about 240 degrees.

Figure 4:
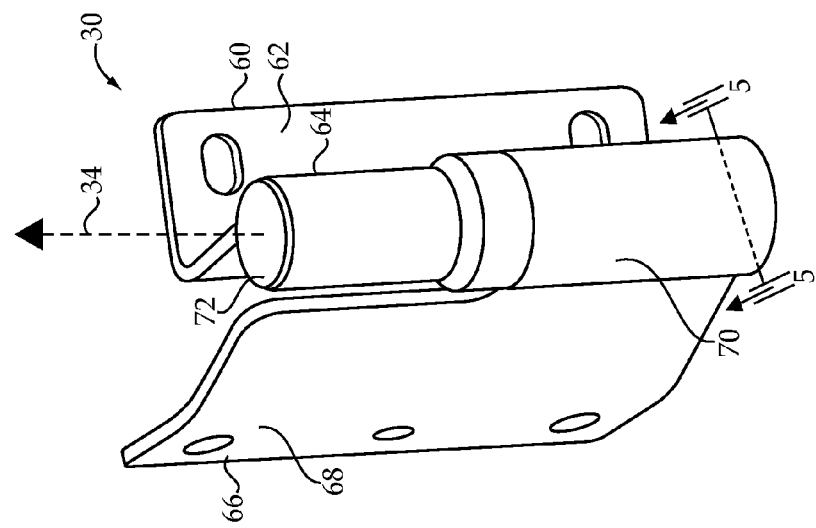
FIG. 4 is a diagrammatic view of a hinge mechanism, according to one embodiment.
Figure 7:
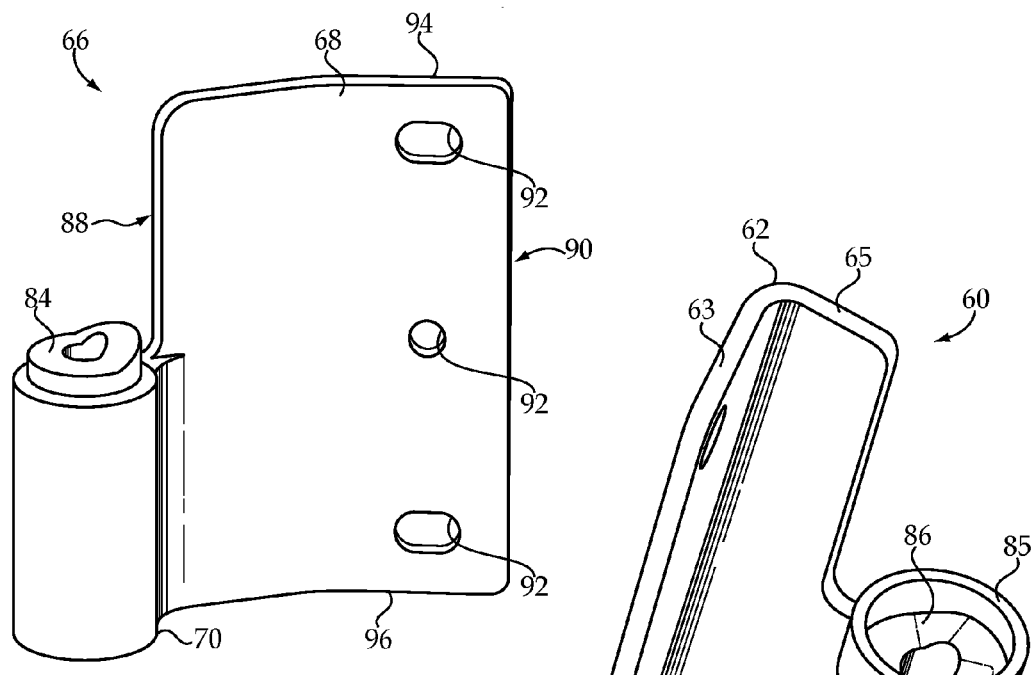
FIG. 7 is a diagrammatic view of a hinge element of the hinge mechanism of FIG. 4.
Figure 8:
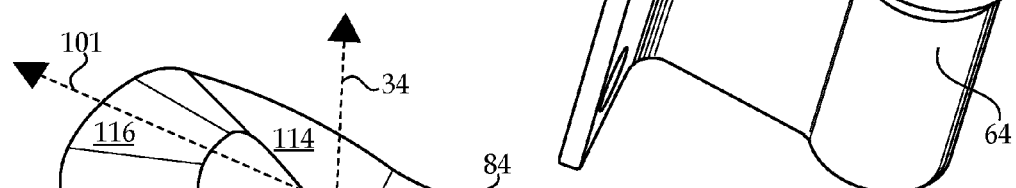
FIG. 8 is a diagrammatic view of another hinge element of the hinge mechanism of FIG. 4.

Referring also now to FIG. 4, there is shown hinge mechanism 30 as it might appear decoupled from frame 26 and door 28. Hinge mechanism 30 includes a first hinge element 60 including a first hinge leaf 62 and a first hinge hub 64, and a second hinge element 66 including a second hinge leaf 68 (hereinafter "leaf 68") and a second hinge hub 70 (hereinafter "hub 70"). A pin assembly 72 couples together first hinge element 60 and second hinge element 66. Referring to FIGS. 7 and 8, leaf 68 includes a plurality of peripheral edges 88, 90, 92, 94, that define a first hinge leaf footprint. Bolt holes 92 extend through leaf 68. Hub 70 protrudes from one of the plurality of peripheral edges, as illustrated peripheral edge 88, such that hub 70 is positioned at least partially outside of the second hinge leaf footprint. From FIG. 8, it can be seen that first hinge element 60 analogously includes a first plurality of peripheral edges (not numbered), and first hinge hub 64 (hereinafter "hub 64") protrudes from one of the first plurality of peripheral edges, such that hub 64 is positioned at least partially outside of the first hinge leaf footprint. In the illustrated embodiment second hinge leaf 62 (hereinafter "leaf 62") has a bent or angled configuration so as to include a first hinge leg 63 and a second hinge leg 65 oriented approximately normal to first hinge leg 63. In other embodiments, leaf 62 could have a substantially planar or curved shape similar to hinge leaf 68. The positioning of hubs 64 and 70 upon hinge leaf peripheral edges and outside of the corresponding hinge leaf footprint enables hinge mechanism 30 to be applied where an associated door pivots in a swing range of about 180 degrees or greater, and can be advantageous from the standpoint of manufacturability in at least certain instances.

In the illustrated embodiment, hub 70 includes a cam surface 84 and hub 64 includes a follower surface 86. As illustrated in FIG. 8, follower surface 86 is recessed within a cup 85 of hub 64. It is contemplated that providing a cup formed by one of hub 64 and hub 70, such that the corresponding cam surface 84 or follower surface 86 is recessed within the cup provides an advantageous strategy for excluding debris and/or maintaining lubricant among and between abutting surfaces, although the present disclosure is not thereby limited. Hub 70 and hub 64 are pivotable relative to one another in a swing range, which corresponds to the swing range of door 28 when hinge mechanism 30 is installed to couple door 28 to frame 26, such that cam surface 84 and follower surface 86 rotate relative to one another about pivot axis 34. Follower surface 86 abuts cam surface 84 such that the relative rotation causes follower surface 86 to follow a profile of cam surface 84. The following of the profile of cam surface 84 during appropriate parts of the swing range of hinge mechanism 30, and thus door 28, enables the slowing of the swing of door 28 as further described herein. Cam surface 84 may have a double-sloped profile for this purpose, as further described herein.

Figure 6:
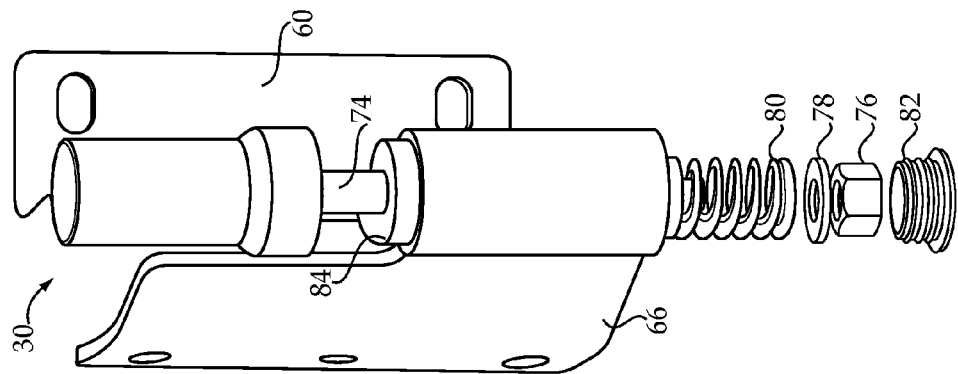
FIG. 6 is a disassembled view of the hinge mechanism of FIG. 4.
Figure 5:
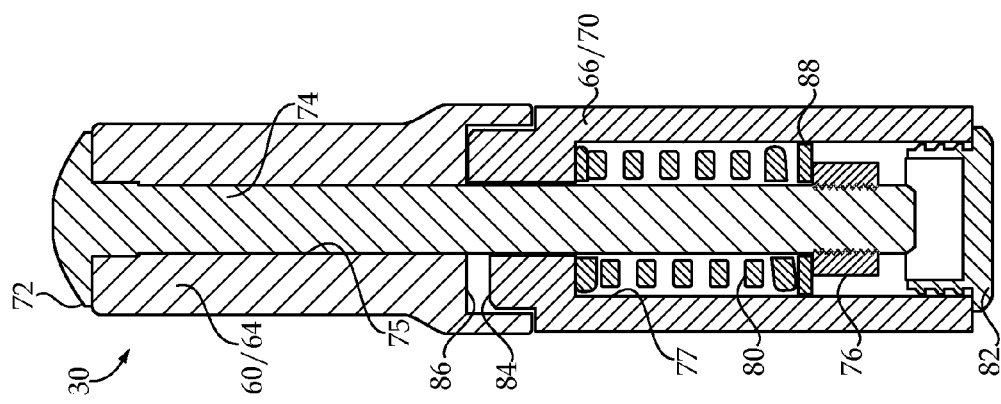
FIG. 5 is a sectioned view taken along line 5-5 of FIG. 4.

Referring now to FIGS. 5 and 6, there are shown features of hinge mechanism 30 in further detail. As noted above pin assembly 72 couples together hub 64 and hub 70. Pin assembly 72 includes a pin 74 extending at least partially through each of a bore 75 in hub 60 and a bore 77 in hub 70, and a biasing spring 80 positioned within bore 77 and about pin 74. Biasing spring 80 is held in compression within hinge mechanism 30 so as to bias cam surface 84 and follower surface 86 in contact with one another. Pin assembly 72 further includes an adjustment nut 76 threadedly engaged with pin 74, and rotatable to adjust a compression state of biasing spring 80. As further discussed herein, adjusting a compression state of biasing spring 80 can vary a spring force applied to hold cam surface 84 and follower surface 86 in contact with one another, in turn providing an adjustable force to slow rotation of hinge mechanism 30 and thus control the swing of door 28. Only a single biasing spring 80 can provide the desired bias regardless of where door 28 is in its swing range. Pin assembly 72 may further include a washer 78 positioned between nut 78 and spring 80, and an end cap 82 to resist intrusion of debris into hinge mechanism 30 and/or to retain lubricant therein, for instance.

Figure 9:
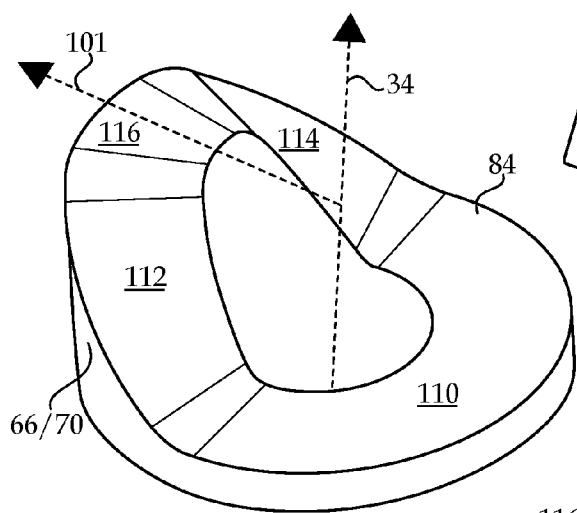
FIG. 9 is a perspective view of a portion of the hinge element of FIG. 4, showing a cam surface.
Figure 10:
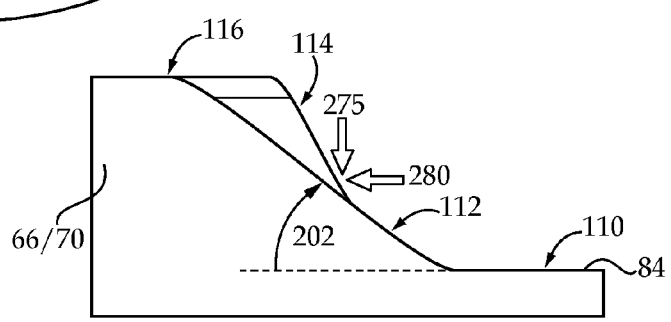
FIG. 10 is a side view of the portion of the hinge element shown in FIG. 9.

Referring also now to FIGS. 9 and 10, there are shown views of cam surface 84 illustrating features in greater detail. Cam surface 84 may have a double-sloped profile as noted above, formed by an opening ramp surface 114 contacted by follower surface 86 in a first portion of the swing range corresponding to swinging access door 28 between a closed position and a dwell position, and a closing ramp surface contacted by follower surface 86 in a second portion of the swing range corresponding to swinging access door 28 between the open position and the dwell position. The terms "opening" and "closing" are used in reference to the function of surfaces 114 and 112 in opening door 28 and closing door 28, respectively, although it will be appreciated that the co-acting of cam surface 84 and follower surface 86 occurs regardless of the direction that door 28 is pivoting.

In an embodiment, the profile of cam surface 84 includes a profile of rotation about pivot axis 34. When pin 74 is positioned through hubs 64 and 70 cam surface 84 can be understood to extend circumferentially around pin 74. Opening ramp surface 114 may have an axially advancing orientation in a first circumferential direction, and closing ramp surface 112 may have an axially advancing orientation in a second circumferential direction. Cam surface 84 may also include a dwell surface 116 extending circumferentially between opening ramp surface 114 and closing ramp surface 112. Dwell surface 116 may have a substantially planar shape, and is located at a first axial position, and cam surface 84 may further include a base surface 110 opposite dwell surface 116 and located at a second axial location. A circumferential extent of dwell surface 116 may be less than a circumferential extent of base surface 110. Follower surface 86 may contact dwell surface 116 when access door 28 is at the dwell position, and may contact base surface 110 when access door 28 is at the closed position or the fully open position. Follower surface 86 may have a variety of shapes so long as the interaction between cam surface 84 and follower surface 86 is such that follower surface 86 can follow the profile of cam surface 84. In one embodiment, follower surface 86 is at least partially complementary in shape to cam surface 84.

A horizontal line 101 is also shown in FIG. 9 and can be understood to extend through pivot axis 34 and also through vertical axis 100, although vertical axis 100 is not shown in FIG. 9. It can further be understood that pivot axis 34 and vertical axis 100 define a plane and horizontal line 101 lies in that plane, with line 101 and thus the plane intersecting dwell surface 116. In FIG. 10, an angle 202 is shown. Each of opening ramp surface 114 and closing ramp surface 112 can be understood to extend at angle 202 between dwell surface 116 and base surface 110. Angle 202 may be equal to about 45 degrees in some embodiments. Also shown in FIG. 10 is an arrow 275 that represents a generally downward force of the weight of door 28 and a spring force of spring 80. Another arrow 280 is shown depicting a force from the door swing torque. Those skilled in the art will appreciate that various factors can affect the pivoting characteristics of door 28, including the angle of pivot axis 34, the size of angle 202, the size and stiffness of spring 80, and the extent of tightening nut 76. Depending upon the application at least some of these factors can be tuned or adjusted so that door 28 operates as desired. In still other instances, cam surface 84 could be rotated about pivot axis 34 so that opening ramp surface 114 and closing ramp surface 112 are encountered by follower surface 86 in different parts of the swing range. In still further embodiments, rather than a symmetrical profile of rotation as shown, one of opening ramp surface 114 and closing ramp surface 112 could be steeper than the other. Still further variations upon the illustrated profile of cam surface 84 to various ends will be apparent to those skilled in the art in light of the present disclosure.

INDUSTRIAL APPLICABILITY

Referring to the drawings generally, when an operator wishes to enter or exit cab 24, he or she will typically unlatch and/or unlock door 28, and door 28 will pivot about hinge mechanism 30 in a first direction and in a first portion of the swing range from the closed position toward the dwell position. Door 28 could settle at the dwell position or swing past the dwell position. Door 28 could also be opened all the way by the operator. Door 28 may also be latched at the fully open position while the operator enters or exits the machine, or may be kept latched open during operation to increase air flow into cab 24, for instance. When returning from the fully open position, door 28 will be pivoted about hinge mechanism 30 in a second direction and in a second portion of the swing range from the fully open position toward the dwell position.

As described herein, follower surface 86 may contact opening ramp surface 114 during pivoting door 28 in the first portion of the swing range so as to control the swing of door 28. The control of the swing may reduce a tendency of door 28 to fall under the force of gravity from the closed position toward the dwell position. Follower surface 86 may also contact second ramp surface 112 during pivoting door 28 in the second portion of the swing range so as to reduce a tendency of door 28 to fall under the force of gravity from the fully open position toward the dwell position. Contact of follower surface 86 with second ramp surface and/or first ramp surface 114 may be such that the tendency of door 28 to fall under the force of gravity from the closed position toward the dwell position and/or from the open position toward the dwell position may be reduced to zero tendency so that door 28 is not biased to pivot at all. The generally downward force produced by the weight of door 28 and the force of spring 80 can be used to oppose the force from the door opening torque in either case, which is generally dependent upon the force of gravity. The spring force of biasing spring 80 will additionally oppose the tendency of door 28 to fall under the force of gravity from either of the closed position or the fully open position toward the dwell position. When door 28 is at the dwell position follower surface 86 may be in contact with dwell surface 116.

In view of the foregoing description it will be appreciated that the present disclosure can be advantageously applied to a machine environment where cab doors are hung at angles relative to a vertical axis between a roof and a floor of the cab. Due to the desire for optimized operator field of view and line of sight to the blade, motor graders are particularly improved by implementation of the present strategies. Other machine types and machine environments exist, however, where doors swing about diagonal pivot axes. Moreover, engineers are always experimenting with different machine types and cab configurations, and thus further applications for controlling the swing of machine access doors can be expected to become evident in view of the teachings set forth herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An operator cab for a machine, the operator cab comprising:
   a frame including a roof, a floor positioned vertically below the roof, sides extending between the roof and the floor, and at least one of the sides having an access opening formed therein;
   an access door coupled to the frame and being pivotable in a swing range from a closed position blocking the access opening, to an open position;
   a hinge mechanism defining a pivot axis, the hinge mechanism including a first hinge element mounted to the frame and a second hinge element mounted to the access door to guide pivoting of the access door;
   the pivot axis being oriented diagonally relative to a vertical axis extending between the roof and the floor;
   the hinge mechanism further including a cam surface and a follower surface abutting the cam surface and rotatable relative to the cam surface during the pivoting of the access door; and
   the cam surface including an opening ramp surface contacted by the follower surface in a first portion of the swing range to control the pivoting of the access door between the closed position and a dwell position, and a closing ramp surface contacted by the follower surface in a second portion of the swing range to control the pivoting of the access door between the open position and the dwell position.

2. The operator cab of claim 1 wherein the door is biased by the force of gravity to pivot outwardly from either of the closed position or the open position toward the dwell position, and wherein the cam surface is located on the first hinge element, and the follower surface is located on the second hinge element.

3. The operator cab of claim 1 wherein the opening ramp surface has an axially advancing orientation in a first circumferential direction, and the closing ramp surface has an axially advancing orientation in a second circumferential direction.

4. The operator cab of claim 3 wherein the cam surface includes a dwell surface extending circumferentially between the opening ramp surface and the closing ramp surface.

5. The operator cab of claim 4 wherein the pivot axis and the vertical axis define a plane, and the plane intersects the dwell surface.

6. The operator cab of claim 4 wherein the dwell surface is located at a first axial position, and the cam surface further includes a base surface opposite the dwell surface and located at a second axial location.

7. The operator cab of claim 1 wherein the pivot axis is oriented at an angle relative to the vertical axis that opens in a vertically upward direction.

8. The operator cab of claim 1 wherein the swing range is greater than 180 degrees.

9. The operator cab of claim 8 wherein the dwell position is about half-way between the closed position and the open position.

10. A hinge mechanism for coupling an access door to a frame of an operator cab in a machine, the hinge mechanism comprising:
   a first hinge element including a first hinge leaf having a first plurality of peripheral edges defining a first hinge leaf footprint, and a first hinge hub protruding from one of the first plurality of peripheral edges, such that the first hinge hub is positioned at least partially outside of the first hinge leaf footprint, and the first hinge hub including a follower surface;
   a second hinge element including a second hinge leaf having a second plurality of peripheral edges defining a second hinge leaf footprint, and a second hinge hub protruding from one of the second plurality of peripheral edges such that the second hinge hub is positioned at least partially outside of the second hinge leaf footprint, and the second hinge hub including a cam surface abutting the follower surface;
   the first hinge hub and the second hinge hub being pivotable relative to one another in a swing range, such that the cam surface and the follower surface rotate relative to one another about a pivot axis; and
   the cam surface having a double-sloped profile formed by an opening ramp surface contacted by the follower surface in a first portion of the swing range corresponding to swinging the access door between a closed position and a dwell position, and a closing ramp surface contacted by the follower surface in a second portion of the swing range corresponding to swinging the access door between an open position and the dwell position,
      wherein one of the first hinge hub or the second hinge hub forms a cup, and
      wherein the corresponding cam surface or follower surface of the other one of the first hinge hub or the second hinge hub is recessed within the cup.

11. The hinge mechanism of claim 10 further comprising a pin assembly including a pin extending at least partially through each of the first hinge hub and the second hinge hub, and a biasing spring positioned about the pin and held in compression so as to bias the cam surface and the follower surface in contact with one another.

12. The hinge mechanism of claim 11 wherein the pin assembly includes an adjustment nut threadedly engaged with the pin, and rotatable to adjust a compression state of the biasing spring.

13. The hinge mechanism of claim 12 wherein the double-sloped profile includes a profile of rotation about the pivot axis, and wherein the cam surface extends circumferentially around the pin and includes a dwell surface extending circumferentially between the opening ramp surface and the closing ramp surface.

14. The hinge mechanism of claim 12 wherein a base surface extends circumferentially between the opening ramp surface and the closing ramp surface, and wherein the base surface is located opposite the dwell surface.

15. The hinge mechanism of claim 14 wherein a circumferential extent of the dwell surface is less than a circumferential extent of the base surface, and wherein the opening ramp surface and the closing ramp surface each extend at an angle, equal to about 45 degrees, between the dwell surface and the base surface.

16. A method of controlling swinging of a door to an access opening in an operator cab of a machine, the method comprising:
   pivoting the door about a hinge mechanism in a first portion of a swing range between a closed position where the door closes the access opening, and a dwell position;
   pivoting the door about the hinge mechanism in a second portion of the swing range between an open position and the dwell position,
      wherein the pivoting of the door in the first portion of the swing range and the pivoting of the door in the second portion of the swing range each include, reducing a tendency of the door to fall under the force of gravity toward the dwell position, and pivoting the door about a pivot axis that is oriented diagonally relative to a vertical axis extending between a roof and a floor of the operator cab;
   contacting a follower surface in a first hinge element of the hinge mechanism with a first ramp surface of a cam surface in a second hinge element of the hinge mechanism, during pivoting the door in the first portion of the swing range; and
   contacting the follower surface with a second ramp surface of the cam surface during pivoting the door in the second portion of the swing range.

17. The method of claim 16 further comprising opposing the tendency of the door to fall under the force of gravity from the closed position toward the dwell position and from the open position toward the dwell position by way of a spring force of a biasing spring held in compression within the hinge mechanism.

18. The method of claim 17 wherein the pivoting of the door in the first portion of the swing range and the pivoting of the door in the second portion of the swing range together include pivoting the door through a swing range of more than 180 degrees.

* * * * *